(12) United States Patent
Annati et al.

(10) Patent No.: US 10,087,947 B2
(45) Date of Patent: *Oct. 2, 2018

(54) TURBOCHARGER COMPRESSOR AND METHOD

(71) Applicant: Caterpillar Inc., Peoria, IL (US)

(72) Inventors: Richard E. Annati, Lafayette, IN (US); Eric Reinhart, West Bloomfield, MI (US); Daniel Singer, Wixom, MI (US)

(73) Assignee: Caterpillar Inc., Deerfield, IL (US)

( * ) Notice: Subject to any disclaimer, the term of this patent is extended or adjusted under 35 U.S.C. 154(b) by 328 days.

This patent is subject to a terminal disclaimer.

(21) Appl. No.: 14/987,207

(22) Filed: Jan. 4, 2016

(65) Prior Publication Data
US 2017/0191492 A1 Jul. 6, 2017

(51) Int. Cl.
| | |
|---|---|
| *F04D 29/28* | (2006.01) |
| *F04D 29/30* | (2006.01) |
| *F02B 37/00* | (2006.01) |
| *F01D 5/04* | (2006.01) |
| *F01D 25/24* | (2006.01) |
| *F01D 25/16* | (2006.01) |
| *F02B 33/40* | (2006.01) |

(52) U.S. Cl.
CPC ............... *F04D 29/30* (2013.01); *F01D 5/04* (2013.01); *F01D 25/162* (2013.01); *F01D 25/24* (2013.01); *F02B 33/40* (2013.01); *F02B 37/00* (2013.01); *F04D 29/284* (2013.01); *F05D 2220/40* (2013.01); *F05D 2240/303* (2013.01); *Y02T 10/144* (2013.01)

(58) Field of Classification Search
CPC ................................. F01D 5/30; F01D 5/284
See application file for complete search history.

(56) References Cited

U.S. PATENT DOCUMENTS

| | | | |
|---|---|---|---|
| 3,904,308 A | * | 9/1975 | Ribaud ................... F04D 21/00 415/143 |
| 4,502,837 A | | 3/1985 | Blair et al. |

(Continued)

FOREIGN PATENT DOCUMENTS

| | | |
|---|---|---|
| DE | 102009007843 A1 | 8/2010 |
| EP | 0205001 A1 | 12/1986 |

(Continued)

*Primary Examiner* — Justin Seabe
(74) *Attorney, Agent, or Firm* — Leydig, Voit & Mayer, LTD.

(57) ABSTRACT

A turbocharger for use with an internal combustion engine includes a compressor wheel having a central hub having a centerline, a root portion and an end portion. A plurality of blades is formed around the central hub. The plurality of blades includes a group of full-blades extending from the root portion of the central hub up to a maximum distance from the root portion along the centerline, the maximum distance being adjacent the end portion of the central hub. The plurality of blades further includes a group of partial-blades, the partial-blades extending from the root portion of the hub to an area along the centerline that is between 40% and 55% of the maximum distance along the centerline, and the plurality of blades is organized in repeating sets of blades arranged around the compressor wheel, each repeating set including at least one full-blade and at least one partial-blade.

20 Claims, 7 Drawing Sheets

(56) References Cited

U.S. PATENT DOCUMENTS

| | | | |
|---|---|---|---|
| 4,986,733 A * | 1/1991 | Fleury | F01D 5/025 |
| | | | 403/361 |
| 5,213,473 A * | 5/1993 | Fiala | F01D 5/048 |
| | | | 416/183 |
| D368,480 S | 4/1996 | Thirumalaisamy et al. | |
| D554,150 S | 10/2007 | Fausett et al. | |
| D588,158 S | 3/2009 | Austin et al. | |
| D659,719 S | 5/2012 | Austin et al. | |
| 8,512,000 B2 | 8/2013 | Dettmann et al. | |
| 8,997,486 B2 | 4/2015 | Hall | |
| 2008/0289332 A1 | 11/2008 | Decker et al. | |
| 2011/0173975 A1 * | 7/2011 | Sun | F02B 47/08 |
| | | | 60/605.2 |
| 2013/0266450 A1 | 10/2013 | Tomita et al. | |

FOREIGN PATENT DOCUMENTS

| | | |
|---|---|---|
| WO | 2006126993 | 11/2006 |
| WO | WO 2007/022648 A1 | 3/2007 |

* cited by examiner

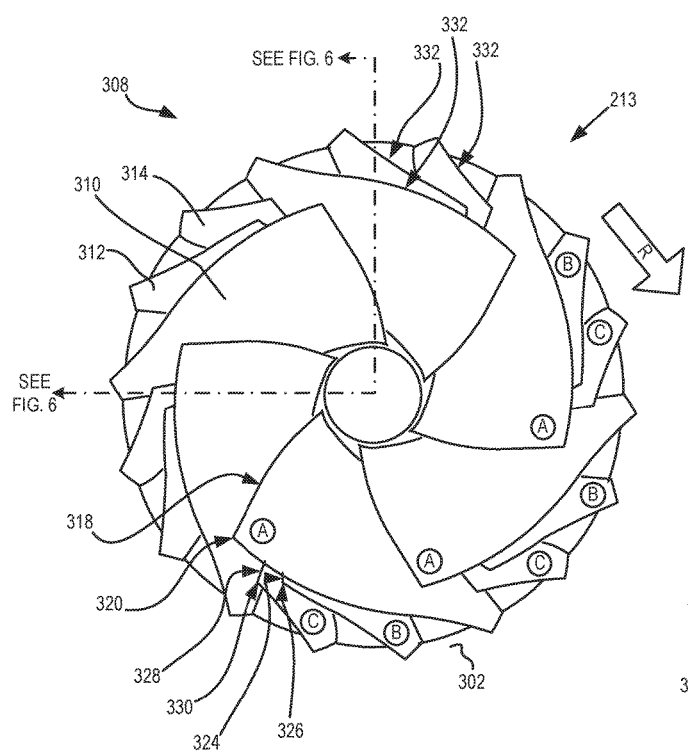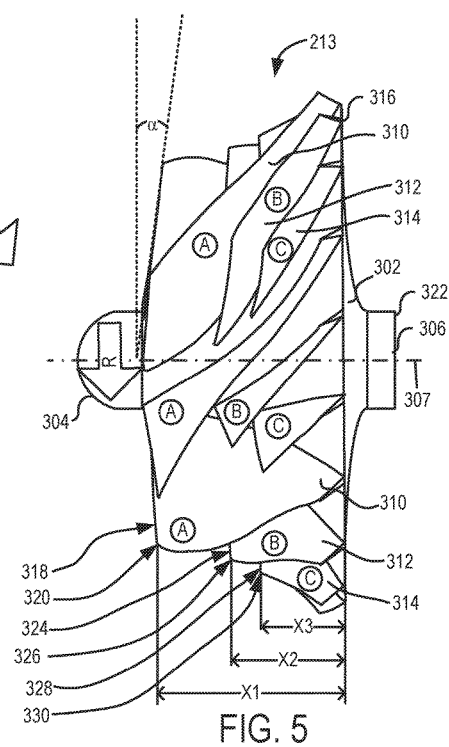
FIG. 4
FIG. 5

TURBOCHARGER COMPRESSOR AND METHOD

TECHNICAL FIELD

This patent disclosure relates generally to turbochargers for use with internal combustion engines and, more particularly, to impellers for centrifugal compressors used as part of turbochargers for use with internal combustion engines.

BACKGROUND

Internal combustion engines are supplied with a mixture of air and fuel for combustion within the engine that generates mechanical power. To maximize the power generated by this combustion process, the engine is often equipped with a turbocharged air induction system.

A turbocharged air induction system includes a turbocharger that uses exhaust from the engine to compress air flowing into the engine, thereby forcing more air into a combustion chamber of the engine than the engine could otherwise draw into the combustion chamber. This increased supply of air allows for increased fuelling, resulting in an increased engine power output.

The fuel energy conversion efficiency of an engine may depend on many factors, including the efficiency of the engine's turbocharger. Turbocharger efficiency can be affected by the structures at the turbine operating to extract energy from the exhaust gas, as well as the structures at the compressor operating to use the extracted energy to compress air that is provided to the engine cylinders.

Various past attempts have been made to increase the efficiency of turbochargers by improving, in part, the operating efficiency of the compressor by adjusting design features of the compressor's impeller. One example of a compressor impeller can be found in DE102009007843A1 (the '843 reference), which describes a compressor wheel having a set of split blades arranged between two consecutive complete blades. As show in the '843 reference, for example, in FIGS. 1 and 2, the compressor wheel includes a longer blade and a shorter blade arranged between full-length blades, in that order, relative to a direction of rotation of the compressor wheel (from right to left as shown in FIG. 2). However, the compressor wheel arrangements described in the '843 patent may only partially achieve considerable efficiency increases for certain frame sizes of compressors, and also for certain compressor wheel sizes, and may not be suitable for large displacement engines that require large amounts of air to pass through the compressor, while also still maintaining acceptable low-end performance.

SUMMARY

The disclosure describes, in one aspect, a turbocharger for use with an internal combustion engine. The turbocharger includes a turbine housing surrounding a rotatable turbine wheel that is connected to a shaft, a center housing that includes a bearing arrangement that rotatably supports the shaft, a compressor housing surrounding an end of the shaft, and a compressor wheel connected to the end of the shaft and being rotatably disposed within the compressor housing.

The compressor wheel includes a central hub having a centerline, a root portion and an end portion, The root portion is disposed adjacent a connection interface of the central hub to a shaft. A plurality of blades is formed around the central hub. The plurality of blades includes a group of full-blades extending from the root portion of the central hub up to a maximum distance from the root portion along the centerline. The maximum distance is disposed adjacent the end portion of the central hub. The plurality of blades further includes a group of partial-blades, which extend from the root portion of the hub to an area along the centerline that is between 40% and 55% of the maximum distance along the centerline. The plurality of blades is organized in repeating sets of blades arranged around the impeller, each repeating set including at least one full-blade and at least one partial-blade.

BRIEF DESCRIPTION OF THE DRAWINGS

FIGS. 4 and 5 illustrate, respectively, front and side perspective views of a compressor wheel in accordance with the disclosure.

DETAILED DESCRIPTION

This disclosure relates to an improved turbocharger configuration for use with an internal combustion engine. More particularly, the disclosure relates to an improved compressor in which a compressor wheel, which can also be referred to as a compressor impeller, that is of a centrifugal compressor type that is arranged with blades of different lengths to increase compressor efficiency and decrease compressor transient response time, thus increasing engine performance.

Figure 1:
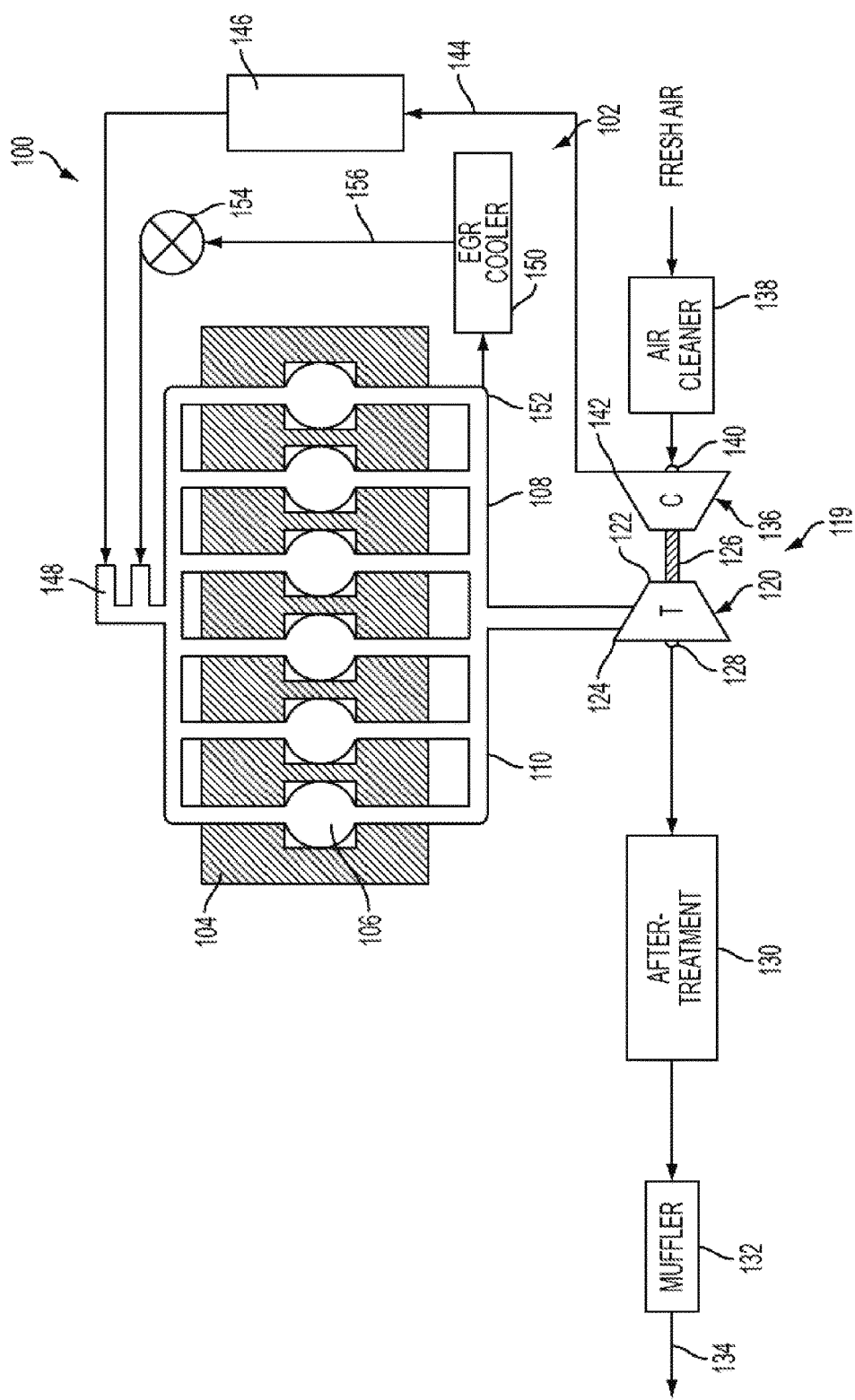
FIG. 1 is a block diagram of an internal combustion engine in accordance with the disclosure.

A simplified, exemplary block diagram of an engine 100 is shown in FIG. 1. The engine 100 includes a cylinder case 104 that houses a plurality of combustion cylinders 106. In the illustrated embodiment, six combustion cylinders are shown in an inline or "I" configuration, but any other number of cylinders arranged in a different configuration, such as a "V" configuration, may be used. The plurality of combustion cylinders 106 is fluidly connected via exhaust valves (not shown) to an exhaust conduit 108. The exhaust conduit 108 is connected to a turbine 120 of a turbocharger 119. In the illustrated embodiment, the turbine 120 includes a housing 122 having a gas inlet 124, which is fluidly connected to the exhaust conduit 108 and arranged to receive exhaust gas therefrom. Exhaust gas provided to the turbine 120 causes a turbine wheel (not shown here) connected to a shaft 126 to rotate. Exhaust gas exits the housing 122 of the turbine 120 through an outlet 128. The exhaust gas at the outlet 128 is optionally passed through other exhaust after-treatment components and systems such as an after-treatment device 130 that mechanically and chemically removes combustion byproducts from the exhaust gas stream, and/or a muffler 132 that dampens engine noise, before being expelled to the environment through a stack or tail pipe 134.

Rotation of the shaft 126 causes a compressor wheel (not shown here) of a compressor 136 to rotate. As shown, the compressor 136 is a radial compressor configured to receive a flow of fresh, filtered air from an air filter 138 through a compressor inlet 140. Pressurized air at an outlet 142 of the compressor 136 is routed via a charge air conduit 144 to a charge air cooler 146 before being provided to an intake manifold 148 of the engine 100. In the illustrated embodiment, air from the intake manifold 148 is routed to the combustion cylinders 106 where it is mixed with fuel and combusted to produce engine power.

An EGR system 102, which is optional, includes an EGR cooler 150, which is also optional, that is fluidly connected to an EGR gas supply port 152 of the exhaust conduit 108. A flow of exhaust gas from the exhaust conduit 108 can pass through the EGR cooler 150 where it is cooled before being supplied to an EGR valve 154 via an EGR conduit 156. The EGR valve 154 may be electronically controlled and configured to meter or control the flow rate of the gas passing through the EGR conduit 156. An outlet of the EGR valve 154 is fluidly connected to the intake manifold 148 such that exhaust gas from the EGR conduit 156 may mix with compressed air from the charge air cooler 146 within the intake manifold 148 of the engine 100.

The pressure of exhaust gas at the exhaust conduit 108, which is commonly referred to as back pressure, is higher than ambient pressure, in part, because of the flow restriction presented by the turbine 120. The pressure of the air or the air/EGR gas mixture in the intake manifold 148, which is commonly referred to as boost pressure, is also higher than ambient because of the compression provided by the compressor 136. In large part, the pressure difference between back pressure and boost pressure, coupled with the flow restriction and flow area of the components of the EGR system 102, determine the maximum flow rate of EGR gas that may be achieved at various engine operating conditions.

Figure 2:
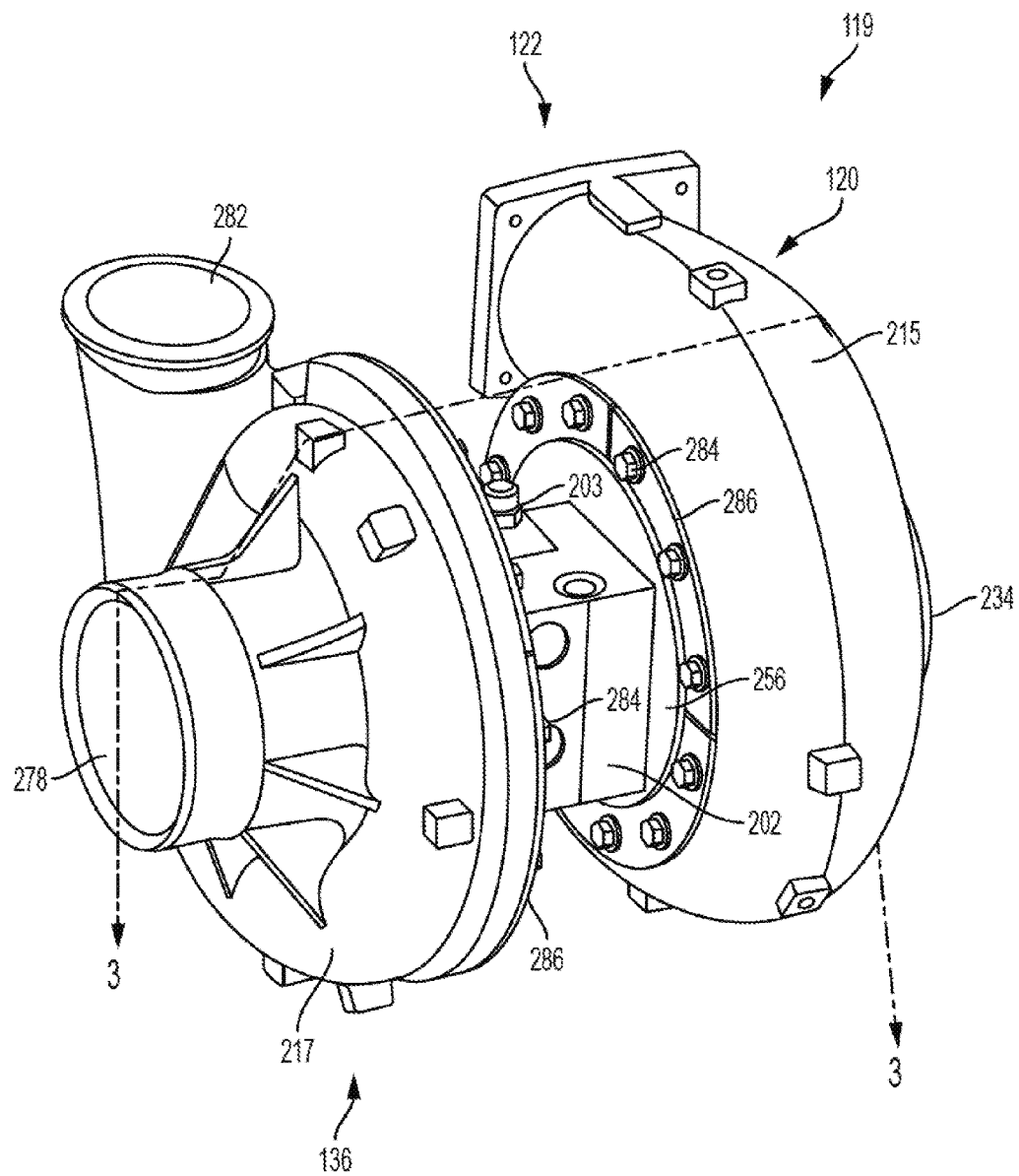
FIG. 2 is a perspective view of a turbocharger assembly in accordance with the disclosure.
Figure 3:
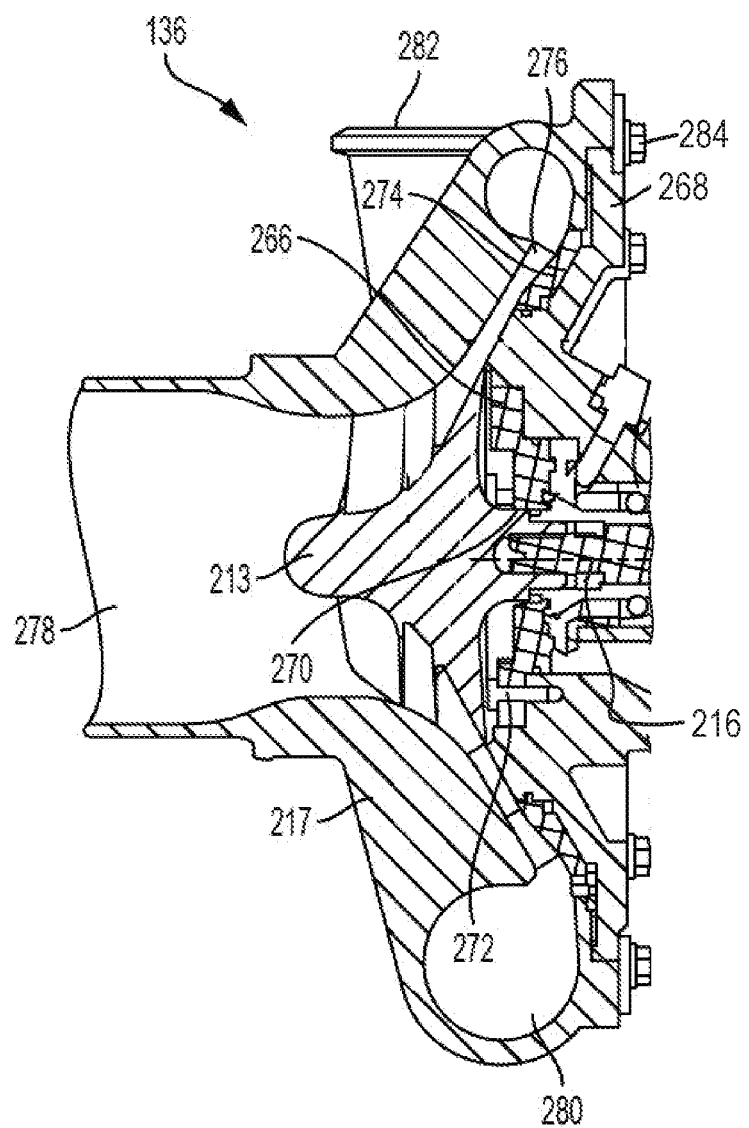
FIG. 3 is a section view of the turbocharger assembly shown in FIG. 2.

An outline view of the turbocharger 119 is shown in FIG. 2, and a fragmented view through the compressor is shown in FIG. 3. In reference to these figures, and in the description that follows, structures and features that are the same or similar to corresponding structures and features already described may be, at times, denoted by the same reference numerals as previously used for simplicity. As shown, the shaft 126 is connected to a compressor wheel 213 at one end. The compressor wheel 213 is disposed to rotate within a compressor housing 217.

The compressor 136 includes a compressor vane ring 274 that has vanes 276 disposed radially around the compressor wheel 213. The vanes 276 fluidly connect a compressor inlet bore 278, which contains the compressor wheel 213, with a compressor scroll passage 280 that is formed in the compressor housing 217 and that terminates to a compressor outlet opening 282. Bolts 284 and circular plate segments 286 connect the compressor housing 217 to a compressor mounting plate 268.

Figure 6:
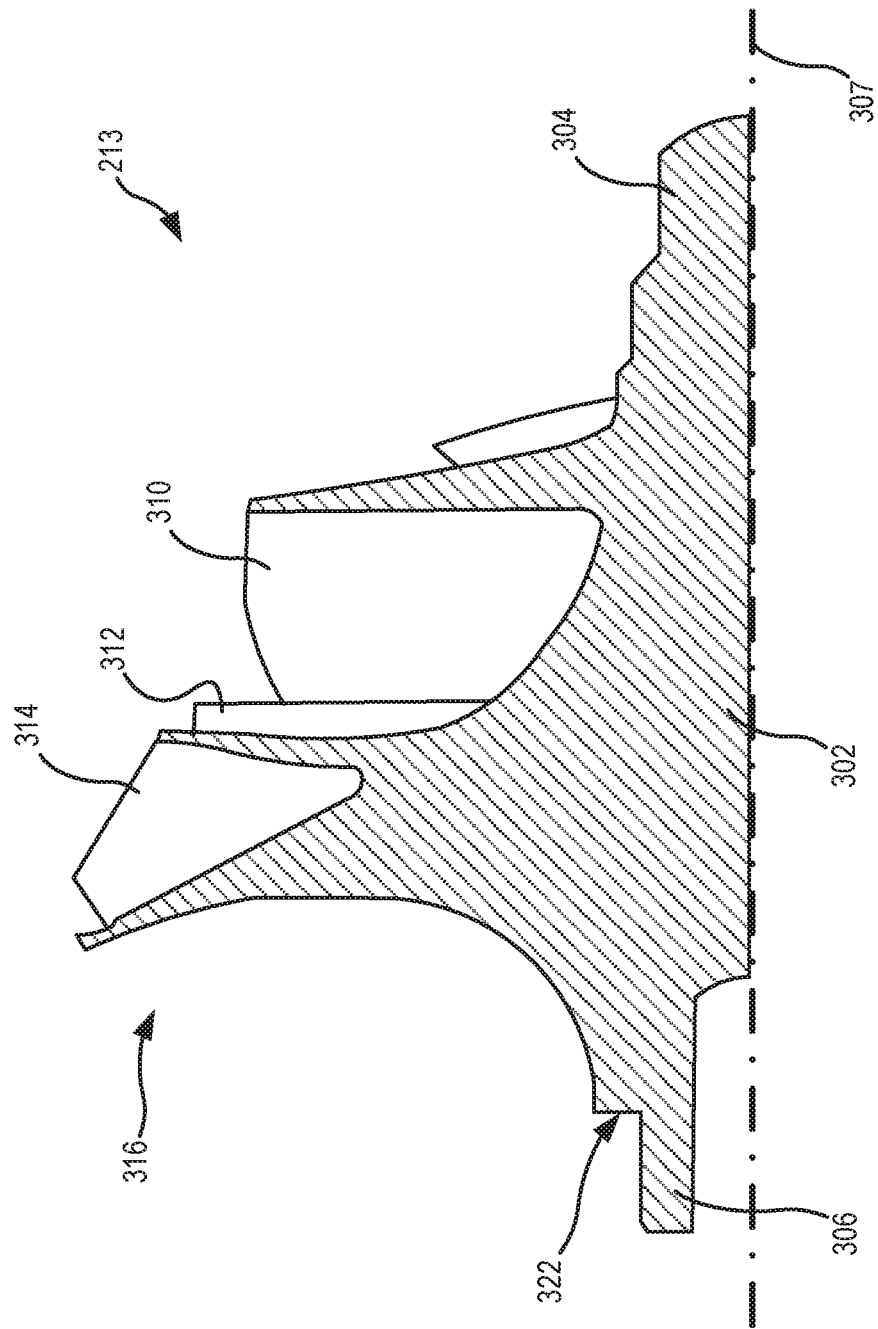
FIG. 6 is a partial section of a compressor impeller in accordance with the disclosure.

An outline view of the compressor rotor or compressor wheel 213 is shown from a front perspective in FIG. 4, and from a side perspective in FIG. 5. A partial section view of the compressor wheel 213 is shown in FIG. 6. In reference to these figures, the compressor wheel 213 includes a central hub 302 having a free end 304 and a connection end 306, at which the compressor wheel 213 can be connected into the shaft 126 (FIG. 3). In the illustrated embodiment, the central hub 302 has a generally circular cross section, whose diameter decreases non-linearly in a direction from the connection end 306 to the free end 304 of the central hub 302, as shown in FIG. 6, along a hub centerline 307.

Various blades 308 are formed around and along the central hub 302. The blades 308 operate to redirect air entering the compressor towards the compressor outlet while also compressing the air. In the illustrated embodiment, three different types of blades 308 are shown formed on the compressor wheel 213. Specifically, the compressor wheel 213 includes a first plurality of blades 310, a second plurality of blades 312 and a third plurality of blades 314. Each blade in the first, second and third pluralities of blades 310, 312 and 314 operate to redirect air towards the compressor outlet, and/or split air streams passing over and around the compressor wheel to increase compressor efficiency.

More specifically, each of the first plurality of blades 310 is a full-size blade, compared to the remaining blades 308, meaning, that the full-size blade extends from a root area 316 of the central hub 302 up to an area adjacent the free end 304, as shown in FIG. 5. Each of the first plurality of blades 310 includes a leading edge 318 disposed close to the free end 304 and is swept back, extending at an acute angle, α, with respect to the hub centerline 307 of about 9.5 degrees. Each leading edge 318 forms a tip 320. The tips 320 are disposed at a first distance, X1, from a root diameter 322 of the central hub 302, as shown in FIG. 5. The first plurality of blades 310 in the compressor wheel 213 as illustrated in FIGS. 4 and 5 includes six blades.

Each of the second plurality of blades 312, which can be referred to as a half-blade, is shorter than a full-size blade, which means that each of the second plurality of blades 312 extends from the root area 316 of the central hub 302 up to an area that is closer to the root diameter 322 than the leading edges 318 of the first plurality of blades 310. Each of the second plurality of blades 312 includes a leading edge 324 that forms a tip 326, which is disposed at a second distance, X2, from the root diameter 322 of the central hub 302, as shown in FIG. 5. The second plurality of blades 312 in the compressor wheel 213 as illustrated in FIGS. 4 and 5 includes six blades.

Similar to the second plurality of blades 312, each of the third plurality of blades 314, which can be referred to as a partial-blade, is shorter than a full-size blade, which means that each of the third plurality of blades 314 extends from the root area 316 of the central hub 302 up to an area that is closer to the root diameter 322 than the leading edges 318 of the first plurality of blades 310 and also the leading edges 324 of the second plurality of blades 312. Each of the third plurality of blades 314 includes a leading edge 328 that forms a tip 330, which is disposed at a third distance, X3, from the root diameter 322 of the central hub 302, as shown in FIG. 5. The third plurality of blades 314 in the compressor wheel 213 as illustrated in FIGS. 4 and 5 includes six blades.

As can be seen in FIG. 5, the first, second and third pluralities of blades 310, 312 and 314, respectively, are arranged in sets such that each set includes one blade from each of the pluralities of blades for a total of 18 blades in the illustrated embodiment, but other arrangements having different multiples of 3-blade sets, for example, fewer or more than 6, 9, 12, 15, 21, 24, and so on, may be used depending on the size of the compressor wheel and other design considerations.

Moreover, different ratios of the lengths X1, X2 and X3 can be used. In the illustrated embodiment, X1 is selected such that X1 is equal to about 1.6 times X2 and about 2.2 times X3. Stated differently, for the illustrated embodiment, $X2 \approx 0.62*X1$, or 62% of X1, but it can be anywhere in the range between 55% and 70% of X1. Similarly, $X3 \approx 0.46*X1$, or 46% of X1, but it can be anywhere in the range between 40% and 55%. Based on this relations, it can be appreciated that $X2 \approx 1.36*X3$, or $X3 \approx 0.73*X2$, or about 73% of X2, but it can be anywhere in the range between 65% and 80%.

At the root of the wheel, the blades are arranged such that, in a rotation direction, R, as denoted in the figure, a blade from the first plurality of blades 310 is follows a blade from the second plurality of blades 312, and then the two are follow a blade from the third plurality of blades 314 for any radial location of the compressor wheel 213 as the compressor wheel 213 rotates. However, close to the free end 304, the blades are arranged differently such that the leading edge 328 of a blade from the third plurality of blades 314 follows the leading edge 318 of a blade from the first plurality of blades 310, and then the leading edge 324 of a blade from the second plurality of blades 312 follows.

These arrangements are shown in FIGS. 4 and 5. In reference to FIG. 5, where the rotation direction R is also denoted, it can be seen that, as the compressor wheel 213 rotates from the top towards the bottom of the figure for the blades that are visible, a blade, A, of the first plurality of blades 310 follows a blade, B, of the second plurality of blades 312, and the two blades A and B follow a blade, C, of the third plurality of blades 314. Thus, with respect to the roots of the blades, the order of blades during rotation can be expressed as C-B-A as the compressor wheel 213 rotates. Regarding the leading edges, as can be seen in FIG. 4, the leading edge of blade A is followed by the leading edge of blade C, and then followed by the leading edge of blade B. Thus, with respect to the leading edges of the blades, the order of blades during rotation close to the free end of the wheel can be expressed as A-C-B. The differences in the order in which the various blade features meet the incoming air (which faces the wheel in the orientation shown in FIG. 4, and moves from left to right in the orientation shown in FIG. 5), has advantageously, and unexpectedly, been found to appreciably increase compressor efficiency. Each blade 308 further includes a side edge 332 that is shaped to generally follow a profile of the internal profile of the compressor housing 217 (FIG. 3) with a predetermined clearance, which can be minimized to improve operating efficiency of the compressor.

INDUSTRIAL APPLICABILITY

The present disclosure is applicable to radial turbocharger compressors for internal combustion engines, but can also be applied to other types of compressors having rotating blades. In the embodiments shown herein, a compressor having a compressor wheel or impeller having three separate sets of blades at different lengths and shapes was unexpectedly found to improve compressor and turbocharger efficiency, for example, in terms of pressure ratio across the compressor and in terms of temperature entropy efficiency.

Figure 7:
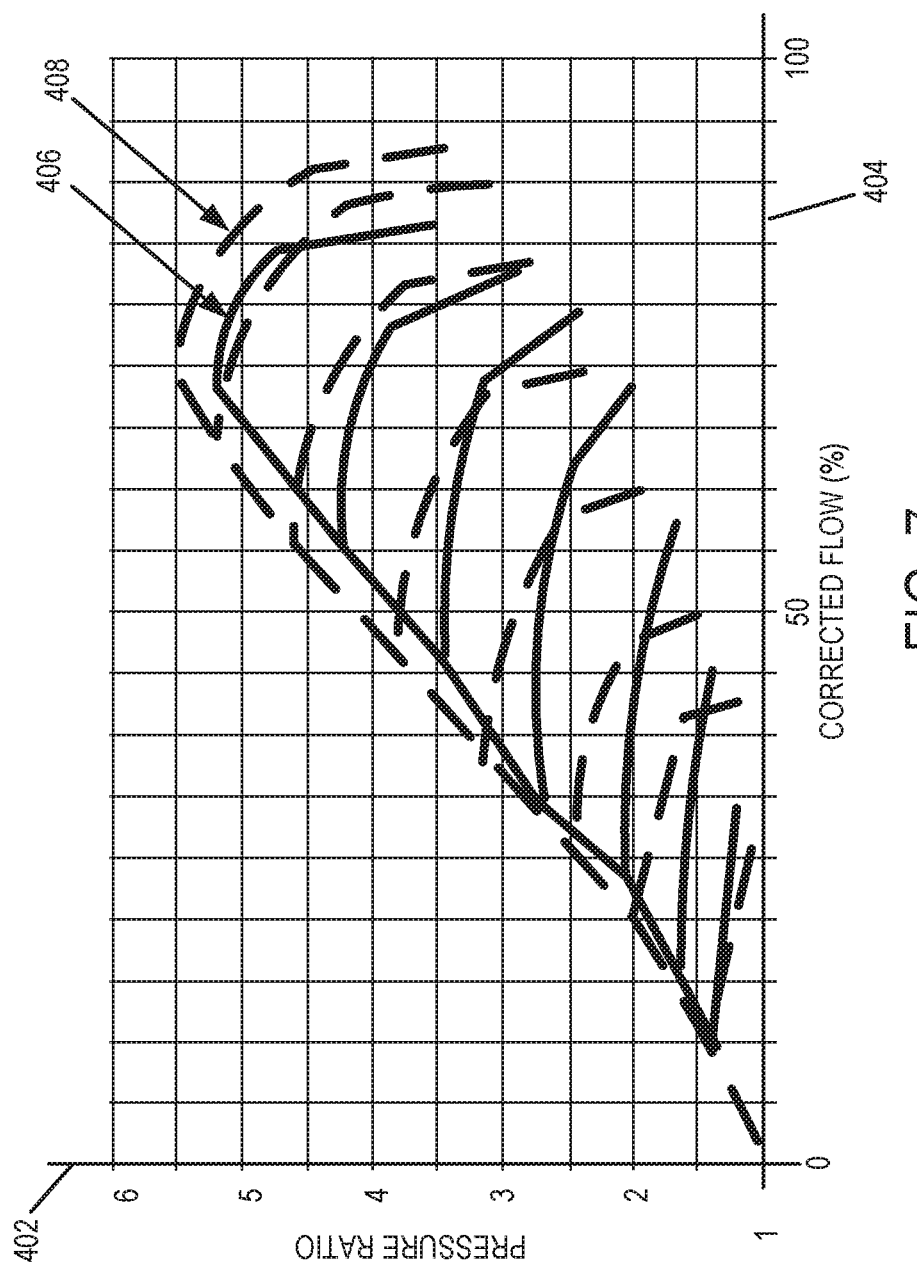
FIGS. 7 and 8 are charts of pressure ratio and efficiency, respectively, for a compressor in accordance with the disclosure.

A qualitative chart showing two pressure ratio maps for a baseline compressor and a compressor having a compressor wheel in accordance with the present disclosure is shown in FIG. 7. In general, pressure ratio for a compressor is defined as a ratio of the absolute pressure of fluid at the outlet of the compressor over the absolute pressure of fluid at the inlet of the compressor. In the graph of FIG. 7, the pressure ratio of both the baseline and improved compressor in accordance with the disclosure is plotted along the vertical axis 402, and a corrected fluid flow through the compressor, as a percentage of a maximum flow, is plotted along the horizontal axis 404. The graph shows two families of curves representing operating points where a baseline curve 406 representing a baseline compressor is shown in solid lines, and an improved curve 408 representing the compressor in accordance with the disclosure is shown in dashed lines. As can be seen from the graph in FIG. 7, the improved compressor performance represented by curves 408 can achieve a consistently higher pressure ratio between 5% and 15% over the baseline compressor represented by curves 406.

Figure 8:
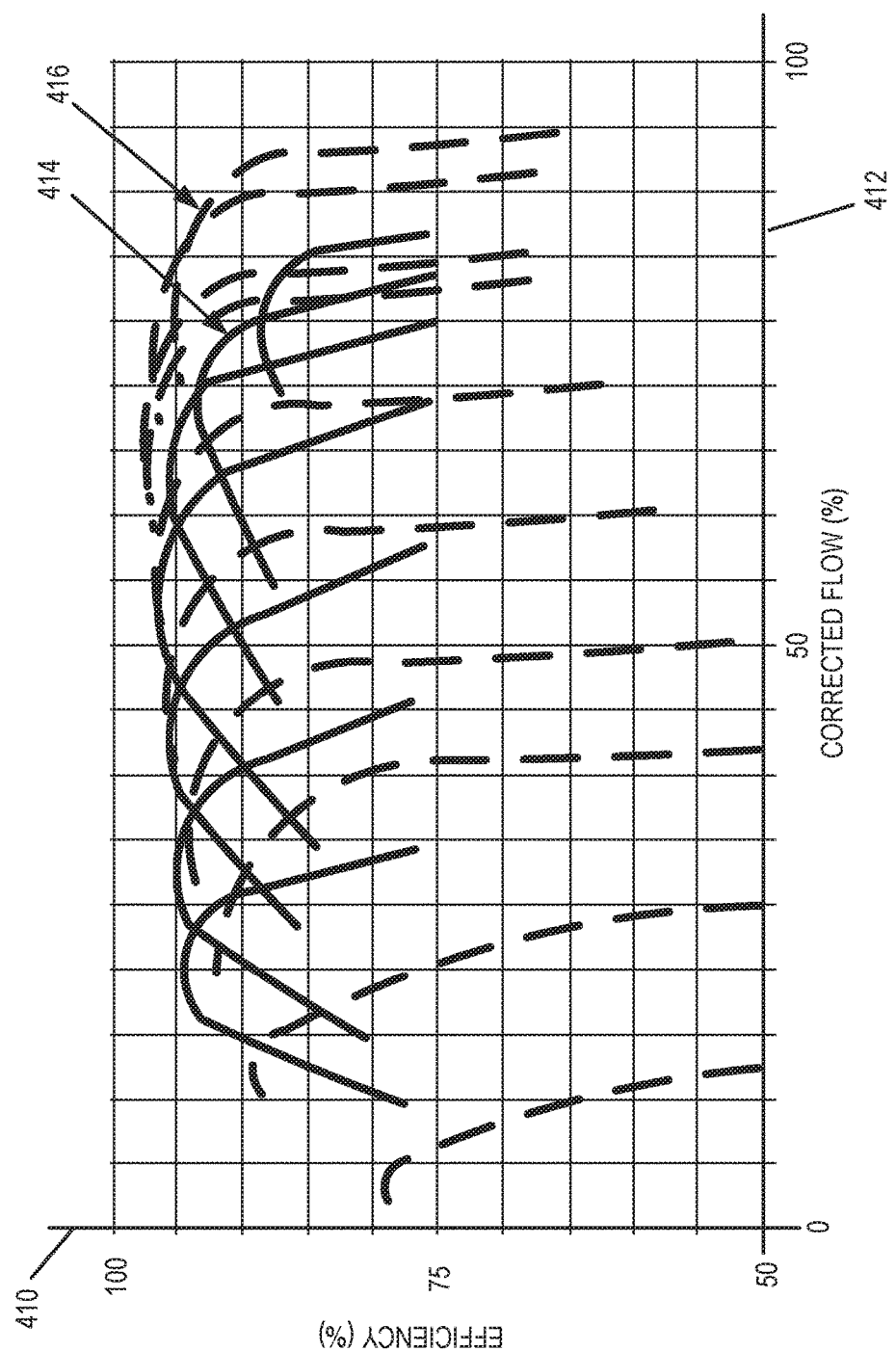

A qualitative chart showing compressor efficiency for a baseline compressor and the compressor having a compressor wheel in accordance with the present disclosure is shown in FIG. 8. In general, compressor efficiency can be considered as the ratio of work output for an ideal isentropic compression process over the work input that is required to develop a particular pressure ratio across the compressor inlet and outlet. In the graph of FIG. 8, compressor efficiencies, expressed as a percentage of a maximum selected energy efficiency, for example, 85%, for both the baseline and improved compressor in accordance with the disclosure are plotted along the vertical axis 410, and a corrected fluid flow through the compressor, as a percentage of a maximum flow, is plotted along the horizontal axis 412. The graph shows two families of curves representing operating points where a baseline family of curves 414 represents the various efficiency curves for the baseline compressor with respect to corrected mass flow, and are shown in solid lines.

The second family of curves 416, shown in dashed lines, represents the performance curves with respect to corrected mass flow of the compressor in accordance with the disclosure. As can be seen from the graph in FIG. 8, the peak efficiency of the baseline compressor begins to fall off above a corrected mass flow of about 55% from an efficiency of about 95% of the selected efficiency baseline down to an efficiency of about 85% at a corrected flow of about 80% of the maximum flow. In contrast, the peak efficiency of the improved compressor is maintained above 95% of the selected baseline efficiency at about 80% through a corrected mass flow of about 80%, and falls to about 90% of the selected efficiency above 90% of the maximum flow.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A turbocharger for use with an internal combustion engine, comprising:
   a turbine housing surrounding a rotatable turbine wheel that is connected to a shaft;
   a center housing that includes a bearing arrangement that rotatably supports the shaft, the shaft extending through the center housing;
   a compressor housing surrounding an end of the shaft; and
   a compressor wheel connected to the end of the shaft and being rotatably disposed within the compressor housing, the compressor wheel comprising:
      a central hub having a centerline, a root portion and an end portion, the root portion being adjacent a connection interface of the central hub to a shaft;

a plurality of blades formed around the central hub, the plurality of blades including a group of full-blades extending from the root portion of the central hub up to a maximum distance from the root portion along the centerline, the maximum distance being adjacent the end portion of the central hub;

wherein the plurality of blades further includes a group of partial-blades, the partial-blades extending from the root portion of the hub to an area along the centerline that is between 40% and 55% of the maximum distance along the centerline;

wherein the plurality of blades further includes a group of half-blades;

wherein the plurality of blades is organized in repeating sets of blades arranged around the compressor wheel, each repeating set including one full-blade that is immediately followed by one partial-blade with respect to a particular radial location relative to a rotation of the compressor wheel; and wherein a single half-blade is disposed immediately adjacent each repeating set.

2. The turbocharger of claim 1, wherein the central hub has a generally circular cross section at a varying diameter, which diameter decreases non-linearly in a direction from the root portion towards the end portion.

3. The turbocharger of claim 1, wherein each full-blade and each partial-blade operates to redirect air radially outward with respect to the centerline and around the root portion when the turbocharger is operating within the compressor housing.

4. The turbocharger of claim 3, wherein each partial-blade operates to split an air stream that moves along and is impelled by an adjacent blade.

5. The turbocharger of claim 1, wherein each full-blade includes a first leading edge disposed close to the end portion.

6. The turbocharger of claim 5, wherein the first leading edge of each full-blade is swept back towards the root portion.

7. The turbocharger of claim 6, wherein the first leading edge of each full-blade extends at an acute angle, $\alpha$, with respect to an axis that is perpendicular to the centerline.

8. The turbocharger of claim 7, wherein the angle, $\alpha$, is about 9.5 degrees.

9. The turbocharger of claim 5, wherein each full-blade forms a first tip at a radially outer end of the respective first leading edge.

10. The turbocharger of claim 9, wherein the first tips of the full-blades are axially aligned relative to the centerline and disposed at a first distance, X1, with respect to a root diameter of the central hub, and wherein the first distance is the maximum distance.

11. The turbocharger of claim 10, wherein each partial-blade includes a third leading edge that forms a third tip.

12. The turbocharger of claim 11, wherein the third tips are axially aligned relative to the centerline and disposed at a third distance, X3, with respect to the root diameter of the central hub.

13. The turbocharger of claim 12, wherein the group of half-blades extends from the root portion of the central hub up to a half-blade area along the centerline that is between 55% and 70% of the maximum distance along the centerline.

14. The turbocharger of claim 13, wherein each half-blade includes a leading edge and a tip, the tips of the half-blades being axially aligned relative to the centerline and disposed at a second distance, X2, with respect to the root diameter of the central hub.

15. The turbocharger of claim 14, wherein X2≈0.62*X1.

16. The turbocharger of claim 14, wherein X3≈0.46*X1.

17. The turbocharger of claim 14, wherein X3 is 0.73*X2.

18. The turbocharger of claim 13, wherein as the compressor wheel is rotating during operation, at a particular radial orientation relative to the root portion of the compressor wheel, a partial-blade passing by the particular radial orientation is followed by a half-blade and then by a full-blade.

19. The turbocharger of claim 13, wherein the half-blade has a half-blade leading edge, and the partial-blade has a partial-blade leading edge, and wherein as the compressor wheel is rotating during operation, at a particular radial orientation relative to the rotation of the compressor wheel, the first leading edge passing by the particular radial orientation is followed by a partial-blade leading edge and then by a half-blade leading edge.

20. The turbocharger of claim 13, wherein the plurality of blades consists of six full-blades, six half-blades and six partial-blades.

* * * * *